United States Patent
Prebble

(10) Patent No.: US 11,721,119 B2
(45) Date of Patent: Aug. 8, 2023

(54) FINDING NATURAL IMAGES IN DOCUMENT PAGES

(71) Applicant: Konica Minolta Business Solutions U.S.A., Inc., San Mateo, CA (US)

(72) Inventor: Tim Prebble, Longmont, CO (US)

(73) Assignee: Konica Minolta Business Solutions U.S.A., Inc., San Mateo, CA (US)

(*) Notice: Subject to any disclaimer, the term of this patent is extended or adjusted under 35 U.S.C. 154(b) by 296 days.

(21) Appl. No.: 17/127,174

(22) Filed: Dec. 18, 2020

(65) Prior Publication Data

US 2022/0198185 A1   Jun. 23, 2022

(51) Int. Cl.
*G06V 30/413*   (2022.01)
*G06T 11/20*    (2006.01)

(52) U.S. Cl.
CPC ............ *G06V 30/413* (2022.01); *G06T 11/20* (2013.01); *G06T 2210/12* (2013.01)

(58) Field of Classification Search
None
See application file for complete search history.

(56) References Cited

U.S. PATENT DOCUMENTS

| | | | |
|---|---|---|---|
| 10,176,400 B1* | 1/2019 | Rivard ............. | G06V 30/19087 |
| 2003/0198386 A1* | 10/2003 | Luo ................. | G06V 20/62 382/199 |
| 2009/0136080 A1* | 5/2009 | Zandifar ............ | H04N 1/32208 382/100 |
| 2009/0285482 A1* | 11/2009 | Epshtein ................. | G06V 20/63 382/176 |
| 2010/0220929 A1* | 9/2010 | Misawa ................... | G06F 16/54 382/190 |
| 2010/0329587 A1 | 12/2010 | Lee et al. | |
| 2013/0330004 A1* | 12/2013 | Bala ..................... | G06V 10/457 382/176 |
| 2015/0093018 A1* | 4/2015 | Macciola ............... | G01B 11/14 382/154 |
| 2015/0093021 A1* | 4/2015 | Xu ....................... | G06V 30/412 382/159 |
| 2015/0154464 A1* | 6/2015 | Manmatha ........... | G06V 10/267 382/176 |
| 2016/0253571 A1* | 9/2016 | Campbell ................ | G06K 9/00 382/195 |
| 2019/0095743 A1* | 3/2019 | Li ........................ | G06V 30/15 |

FOREIGN PATENT DOCUMENTS

CN   1458791 A * 11/2003   ......... G06K 9/00456

OTHER PUBLICATIONS

Yao et al., "Detecting texts of arbitrary orientations in natural images," 2012 IEEE Conference on Computer Vision and Pattern Recognition, 2012, pp. 1083-1090, doi: 10.1109/CVPR.2012.6247787.*
Epshtein et al., "Detecting text in natural scenes with stroke width transform," 2010 IEEE Computer Society Conference on Computer Vision and Pattern Recognition, 2010, pp. 2963-2970, doi: 10.1109/CVPR.2010.5540041.*
Shahab et al., "ICDAR 2011 Robust Reading Competition Challenge 2: Reading Text in Scene Images," 2011 International Conference on Document Analysis and Recognition, 2011, pp. 1491-1496, doi: 10.1109/ICDAR.2011.296.*
Yi et al., "Text String Detection From Natural Scenes by Structure-Based Partition and Grouping," in IEEE Transactions on Image Processing, vol. 20, No. 9, pp. 2594-2605, Sep. 2011, doi: 10.1109/TIP.2011.2126586.*
Pan et al., "A Hybrid Approach to Detect and Localize Texts in Natural Scene Images", IEEE Transactions on Image Processing, vol. 20, No. 3, Mar. 2011, pp. 800-813.*
Ansari et al., "A novel machine learning approach for scene text extraction", Future Generation Computer Systems 87 (2018), 2018, pp. 328-340.*
Sun et al., "A robust approach for text detection from natural scene images", Pattern Recognition 48 (2015), 2015, pp. 2906-2920.*
Koo et al., "Text-Line Detection in Camera-Captured Document Images Using the State Estimation of Connected Components", IEEE Transactions on Image Processing, vol. 25, No. 11, Nov. 2016, pp. 5358-5368.*

* cited by examiner

*Primary Examiner* — Guillermo M Rivera-Martinez
(74) *Attorney, Agent, or Firm* — Osha Bergman Watanabe & Burton LLP

(57) ABSTRACT

An image processing method includes: generating, from combined connected components (CCs) of a document image, candidate text CCs, candidate background CCs, and candidate natural image CCs where the candidate background CCs are excluded from the combined CCs to generate the candidate natural image CCs with a predetermined criterion dependent on the candidate text CCs; generating a final natural image bounding box by expanding a candidate natural image bounding box of the candidate natural image CCs and including in the expanded candidate natural image bounding box at least one combined CC that intersects the expanded candidate natural image bounding box; and modifying, based on the final natural image bounding box, the document image and displaying the modified document image to a user.

21 Claims, No Drawings

FINDING NATURAL IMAGES IN DOCUMENT PAGES

BACKGROUND

A document is a record (something) in printed, written, photographic, or other form. A document may include text and one or more embedded natural images, which are photographs of real world scenes.

Document scanners and camera devices capture images of documents (herein referred to as "document images"). In such document images, image noise generated by image sensors and circuitry of the document scanners and camera devices exists as random variation of brightness or color information.

The background of a document image is a portion that excludes foreground objects (e.g., text, graphics, charts, tables, pictures, and/or other embedded contents) within the document image. In other words, the background and the foreground objects are mutually exclusive portions where the foreground objects are defined as content or more specifically non-background content. Background noise is the image noise in the background of these document images.

SUMMARY

In general, in one aspect, the invention relates to an image processing method for identifying a natural image in a document image. The method includes: generating, by a computer processor and from the document image, a plurality of combined connected components (CCs); generating, by the computer processor from the plurality of combined CCs and based on a first predetermined criterion, a plurality of candidate text CCs; generating, by the computer processor from the plurality of combined CCs and based on a second predetermined criterion, a plurality of candidate background CCs; generating, by the computer processor from the plurality of combined CCs and based on a third predetermined criterion, a plurality of candidate natural image CCs where the plurality of candidate background CCs are excluded from the plurality of combined CCs to generate the plurality of candidate natural image CCs and where the third predetermined criterion is dependent on the plurality of candidate text CCs; generating, by the computer processor, a plurality of candidate natural image bounding boxes of the plurality of candidate natural image CCs; generating, by the computer processor, at least one final natural image bounding box by expanding at least one candidate natural image bounding box and including in the expanded at least one candidate natural image bounding box at least one combined CC of the plurality of combined CCs that intersects the expanded at least one candidate natural image bounding box; and modifying, by the computer processor and based on the at least one final natural image bounding box, the document image and displaying the modified document image to a user.

In general, in one aspect, the invention relates to a system for processing an image to identify a natural image in a document image. The system includes: a memory and a computer processor connected to the memory. The computer processor: generates, from the document image, a plurality of combined connected components (CCs); generates, from the plurality of combined CCs and based on a first predetermined criterion, a plurality of candidate text CCs; generates, from the plurality of combined CCs and based on a second predetermined criterion, a plurality of candidate background CCs; generates, from the plurality of combined CCs and based on a third predetermined criterion, a plurality of candidate natural image CCs where the plurality of candidate background CCs are excluded from the plurality of combined CCs to generate the plurality of candidate natural image CCs and where the third predetermined criterion is dependent on the plurality of candidate text CCs; generates a plurality of candidate natural image bounding boxes of the plurality of candidate natural image CCs; generates at least one final natural image bounding box by expanding at least one candidate natural image bounding box and including in the expanded at least one candidate natural image bounding box at least one combined CC of the plurality of combined CCs that intersects the expanded at least one candidate natural image bounding box; and modifies, based on the at least one final natural image bounding box, the document image and displays the modified document image to a user.

In general, in one aspect, the invention relates to a non-transitory computer readable medium (CRM) storing computer readable instructions for an image processing method that identifies a natural image in a document image. The computer readable instructions, when executed by a computer, includes functionality for: generating, from the document image, a plurality of combined connected components (CCs); generating, from the plurality of combined CCs and based on a first predetermined criterion, a plurality of candidate text CCs; generating, from the plurality of combined CCs and based on a second predetermined criterion, a plurality of candidate background CCs; generating, from the plurality of combined CCs and based on a third predetermined criterion, a plurality of candidate natural image CCs where the plurality of candidate background CCs are excluded from the plurality of combined CCs to generate the plurality of candidate natural image CCs and where the third predetermined criterion is dependent on the plurality of candidate text CCs; generating a plurality of candidate natural image bounding boxes of the plurality of candidate natural image CCs; generating at least one final natural image bounding box by expanding at least one candidate natural image bounding box and including in the expanded at least one candidate natural image bounding box at least one combined CC of the plurality of combined CCs that intersects the expanded at least one candidate natural image bounding box; and modifying, based on the at least one final natural image bounding box, the document image and displaying the modified document image to a user.

Other aspects of the invention will be apparent from the following description and the appended claims.

BRIEF DESCRIPTION OF DRAWINGS

FIG. 1 shows a system in accordance with one or more embodiments of the invention.

FIGS. 2A-2B show flowcharts in accordance with one or more embodiments of the invention.

FIGS. 3A-3R show an implementation example in accordance with one or more embodiments of the invention.

FIGS. 4A-4G show an implementation example in accordance with one or more embodiments of the invention.

FIG. 5 shows a computing system in accordance with one or more embodiments of the invention.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, non-transitory computer readable medium, and system to identify one or more natural images in a document image. The natural images are photographs of real-world scenes. In one or more embodiments of the invention, identifying the natural images includes: generating a collection of combined connected components (CCs) of the document image; generating candidate text CCs from the collection of combined CCs and based on a first predetermined criterion; generating candidate background CCs from the collection of combined CCs and based on a second predetermined criterion; generating candidate natural image CCs from the collection of combined CCs and based on a third predetermined criterion where the candidate text CCs and the candidate background CCs are excluded from the collection of combined CCs to generate the candidate natural image CCs; generating candidate natural image bounding boxes of the candidate natural image CCs; and generating at least one final natural image bounding box by expanding at least one candidate natural image bounding box and including in the expanded at least one candidate natural image bounding box at least one combined CC that intersects the expanded at least one candidate natural image bounding box.

FIG. 1 shows a system (100) in accordance with one or more embodiments of the invention. As shown in FIG. 1, the system (100) has multiple components, including, for example, a buffer (101), a connected component (CC) engine (108), a candidate text CC engine (117), a candidate background CC engine (118), a candidate natural image CC engine (119), a natural image bounding box engine (120), a content mask engine (109), and a noise reduction engine (110). Each of these components (101, 108, 109, 110, 117, 118, 119, 120) may be located on the same computing device (e.g., personal computer (PC), laptop, tablet PC, smart phone, multifunction printer, kiosk, server, etc.) or on different computing devices connected by a network of any size having wired and/or wireless segments. In one or more embodiments, these components may be implemented using the computing system (500) described below in reference to FIG. 5. Each of these components is discussed below.

In one or more embodiments, the buffer (101) may be implemented in hardware (i.e., circuitry), software, or any combination thereof. The buffer (101) is configured to store a document image (102). The document image (102) is an image of a physical document and may be captured from a physical document using a camera device or a document scanner. In one or more embodiments, the document image (102) corresponds to a single page of document. The page size of the document image (102) is the horizontal and vertical dimensions of the document image (102) measured in number of pixels. The physical document includes one or more lines of text made up of characters that are handwritten, typed, and/or printed. The physical document may also include non-text objects such as graphics, charts, tables, pictures, and/or other embedded contents.

The document image (102) may be part of a collection of document images that are processed by the system (100) to generate intermediate and final results. Further, the document image (102) may be of any size and in any image format (e.g., BMP, JPEG, TIFF, PNG, etc.). The document image (102) includes one or more foreground objects that correspond to the text, graphics, charts, tables, pictures, and/or other embedded contents of the physical document. All portions of the document image (102) excluding the foreground objects are considered the background of the document image (102). The document image (102) includes certain amounts of image noise, which is a random variation of brightness or color information in the document image (102). The image noise may be produced by an image sensor, circuitry of a document scanner, and/or a digital camera used to generate the document image (102). The image noise present in the background (107) is referred to as background noise.

The buffer (101) is further configured to store the intermediate and final results of the system (100) that are directly or indirectly derived from the document image (102). The intermediate and final results include at least an original mask (103a), an inverse mask (103b), original CCs (connected components) (104a), inverse CCs (104b), combined CCs (105), selected CCs (106), a content mask (107), a final image (111), candidate text CCs (112), candidate background CCs (113), candidate natural image CCs (114), candidate natural image bounding boxes (115), and final natural image bounding boxes (116), which are described in more detail below.

The original mask (103a) is a binary mask based on a grayscale equivalent of the document image (102). The binary mask is a derivative of an image where pixels are assigned binary values. Specifically, each pixel in the image corresponds to a binary valued pixel in the binary mask. In the grayscale equivalent, the pixel value of each pixel in the document image (102) is converted to an intensity level of the pixel value. In one example, the intensity level may be in the range of 0-255.

The grayscale equivalent of the document image (102) is referred to as the grayscale image. In the original mask (103a), pixels having pixel values in the grayscale image greater than a threshold value are marked while pixels in the grayscale image having pixel values less than or equal to the threshold value are unmarked. In one example, marked pixels may be assigned with the binary number "1" while unmarked pixels may be assigned with the binary number "0". In one or more embodiments, the threshold value is an adaptive threshold that is calculated individually for each pixel in the grayscale image.

In contrast, the inverse mask (103b) is a binary mask based on an inverse grayscale equivalent of the document image (102). In the inverse grayscale equivalent, the pixel value of each pixel in the grayscale image is converted to a complimentary value of the intensity level. In one example, the complimentary value of the intensity level is 255 minus intensity level.

Additionally, the inverse grayscale equivalent of the document image (102) is referred to as the inverse grayscale image. In the inverse mask (103b), pixels having pixel values in the inverse grayscale image greater than a threshold value are marked while pixels in the inverse grayscale image having pixel values less than or equal to the threshold value are unmarked. In one example, the same marking scheme utilizing binary numbers "1" and "0" may be applied to the marked and unmarked pixels (i.e., marked pixels are assigned the binary number "1" while unmarked pixels are assigned the binary number "0"). In one or more embodiments, the threshold is an adaptive threshold that is calculated individually for each pixel in the inverse grayscale image.

The original CCs (104a) are a collection of connected components of the original mask (103a). Each original CC corresponds to a cluster (i.e., a connected set) of marked pixels within the original mask (103a). Based on the pixel correspondence between the original mask (103a) and the document image (102), each original CC corresponds to a geometrically contiguous region within the document image (102). Similarly, the inverse CCs (104b) are a collection of connected components of the inverse mask (103b). Each inverse CC corresponds to a cluster of marked pixels within the inverse mask (103ab). Based on the pixel correspondence between the inverse mask (103b) and the document image (102), each inverse CC corresponds to a geometrically contiguous region within the document image (102).

The combined CCs (105) are a combination of the original CCs (104a) and the inverse CCs (104b). In the combined CCs (105), one or more connected components may be modified to eliminate any overlap with other connected components. Regardless of being an original CC or inverse CC, each connected component in the combined CCs (105) is assigned a unique identifier. In particular, each connected component in the combined CCs (105) corresponds to a uniquely identified region within the document image (102).

Furthermore, each uniquely identified geometrically contiguous region may relate to a portion of a foreground object or to a portion of the background in the document image (102). The foreground objects are to be protected from degradation that may result from the noise reduction process of one or more embodiments. In other words, the protection areas are areas in the document image (102) that are excluded from the noise reduction process.

The protection areas include common protection areas and selected protection areas. The common protection areas are the protection areas identified based on the uniquely identified geometrically contiguous regions belonging to predetermined foreground objects, such as text, natural images, or other frequently occurring objects. The selected protection areas are the protection areas identified based on the uniquely identified geometrically contiguous regions belonging to the remaining foreground objects in the document image (102) other than the predetermined foreground objects.

The selected CCs (106) is a subset of the combined CCs (105) that correspond to the selected protection areas of the document image (102).

The content mask (107) is a binary mask where marked pixels correspond to the protection areas of the document image (102).

The final image (111) is a version of the document image (102) with pixel values of identified noise pixels converted to a uniform background color. In one or more embodiments, the background color is the dominant pixel value in the document image (102). For example, the dominant pixel value may be determined as the mode of a histogram of pixel values in the document image.

The candidate text CCs (112), candidate background CCs (113), candidate natural image CCs (114), candidate natural image bounding boxes (115), and final natural image bounding boxes (116) are intermediate results for generating: a portion of the selected CCs (106) and the protection area corresponding to the natural images in the document image (102).

More specifically, the candidate text CCs (112) are a portion of the combined CCs (105) that are heuristically determined as connected components that are likely to correspond to text characters in the document image (102). The candidate background CCs (113) are a portion of the combined CCs (105) that are heuristically determined as connected components that are likely to correspond to the background of the document image (102). The candidate natural image CCs (114) are a portion of the combined CCs (105) that are heuristically determined as connected components that are likely to correspond to natural images in the document image (102). The candidate natural image bounding boxes (115) are a collection of individual bounding boxes of the candidate natural image CCs (114). The final natural image bounding boxes (116) are iteratively expanded version of the candidate natural image bounding boxes (115) used to encompass any portion of the natural images that may not have been properly detected and included in candidate natural image CCs (114).

In one or more embodiments of the invention, the CC engine (108) may be implemented in hardware (i.e., circuitry), software, or any combination thereof. The CC engine (108) is configured to parse the document image (102) to generate the original mask (103a), inverse mask (103b), original CCs (104a), inverse CCs (104b), combined CCs (105), and selected CCs (106). In one or more embodiments, the CC engine (108) performs the functions described above using the method described below in reference to FIGS. 2A-2B. Examples of the document image (102) and the original mask (103a), inverse mask (103b), original CCs (104a), inverse CCs (104b), combined CCs (105), and selected CCs (106) are shown in FIGS. 3A-3K below.

In one or more embodiments of the invention, the content mask engine (109) may be implemented in hardware (i.e., circuitry), software, or any combination thereof. The content mask engine (109) is configured to generate the content mask (107) based on one or more of the original mask (103a), inverse mask (103b), original CCs (104a), inverse CCs (104b), combined CCs (105), and selected CCs (106). In one or more embodiments, the content mask engine (109) performs the functions described above using the method described below in reference to FIGS. 2A-2B. Examples of the content mask (107) are shown in FIGS. 3L-3N below.

In one or more embodiments, the noise reduction engine (110) may be implemented in hardware (i.e., circuitry), software, or any combination thereof. The noise reduction engine (110) is configured to generate the final image (111) based on the content mask (107). In one or more embodiments, the noise reduction engine (110) performs the functions described above using the method described below in reference to FIGS. 2A-2B. Examples of reducing noise and the final image (111) are shown in FIGS. 3O-3R below.

In one or more embodiments of the invention, the candidate text CC engine (117) may be implemented in hardware (i.e., circuitry), software, or any combination thereof. The candidate text CC engine (117) is configured to analyze the combined CCs (105) to generate the candidate text CCs (112) using the method described below in reference to FIG. 2A. Examples showing the candidate text CC engine (117) analyzing the combined CCs to generate the candidate text CCs are shown in FIGS. 4A-4G below.

In one or more embodiments of the invention, the candidate background CC engine (118) may be implemented in hardware (i.e., circuitry), software, or any combination thereof. The candidate background CC engine (118) is configured to analyze the combined CCs (105) to generate the candidate background CCs (113) using the method described below in reference to FIG. 2A. Examples showing the candidate background CC engine (118) analyzing the combined CCs to generate the candidate background CCs are shown in FIGS. 4A-4G below.

In one or more embodiments of the invention, the candidate natural image CC engine (119) may be implemented in hardware (i.e., circuitry), software, or any combination thereof. The candidate natural image CC engine (119) is configured to analyze the combined CCs (105) to generate the candidate natural image CCs (114) using the method described below in reference to FIG. 2A. Examples showing the candidate natural image CC engine (119) analyzing the combined CCs to generate the candidate natural CCs are shown in FIGS. 4A-4G below.

In one or more embodiments of the invention, the natural image bounding box engine (120) may be implemented in hardware (i.e., circuitry), software, or any combination thereof. The natural image bounding box engine (120) is configured to analyze the candidate natural image CCs (114) to generate the candidate natural image bounding boxes (115) and the final natural image bounding boxes (116) using the method described below in reference to FIG. 2A. Examples showing the natural image bounding box engine (120) analyzing the candidate natural image CCs to generate the candidate natural image bounding boxes and the final natural image bounding boxes are shown in FIGS. 4A-4G below.

Although the system (100) is shown as having eight components (101, 108, 109, 110, 117, 118, 119, 120), in one or more embodiments of the invention, the system (100) may have more or fewer components. Furthermore, the functions of each component described above may be split across components. Further still, each component (101, 108, 109, 110, 117, 118, 119, 120) may be utilized multiple times to carry out an iterative operation.

FIG. 2A shows a flowchart depicting a method for identifying one or more natural images in a document image in accordance with one or more embodiments of the invention. One or more of the steps in FIG. 2A may be performed by the components of the system (100), discussed above in reference to FIG. 1. In one or more embodiments, one or more of the steps shown in FIG. 2A may be omitted, repeated, and/or performed in a different order than the order shown in FIG. 2A. Accordingly, the scope of the invention should not be considered limited to the specific arrangement of steps shown in FIG. 2A.

Referring to FIG. 2A, initially in Step 200, according to one or more embodiments, an original mask and an inverse mask are generated from a document image. The document image is first converted to a grayscale image and an inverse grayscale image. The original mask is generated by applying a thresholding operation to the grayscale image. The inverse mask is generated by applying the thresholding operation to the inverse grayscale image. The thresholding operation assigns a label to each pixel in the document image based on a comparison between the pixel value and a threshold value. As discussed in the examples above, pixels having pixel values greater than the threshold value are marked and assigned the binary value label "1" while pixels having pixel values less than or equal to the threshold value are unmarked and assigned the binary value label "0".

In one or more embodiments, the threshold is determined individually for each pixel in the grayscale image and for each pixel in the inverse grayscale image using an adaptive thresholding algorithm. The matrix of pixels with assigned labels for the grayscale image is designated as the original mask. The matrix of pixels with assigned labels for the inverse grayscale image is designated as the inverse mask. An example of generating the original mask and the inverse mask using the adaptive thresholding algorithm is described in reference to FIGS. 3A-3C below.

In Step 201, one or more original connected components (CCs) are extracted from the original mask. In the original mask, adjacent marked pixels are collected into a cluster of marked pixels. Each cluster of marked pixels is a single original CC. The collection process iterates until each pixel in the original mask either belongs to a specific original CC or is an isolated pixel without any adjacent pixels. Each isolated pixel is designated as a single pixel original CC. An example of extracting the original CCs is described in reference to FIG. 3D below.

Further in Step 201, one or more inverse CCs are extracted from the inverse mask. In the inverse mask, adjacent marked pixels are collected into a cluster of marked pixels. Each cluster of marked pixels is a single inverse CC. The collection process iterates until each pixel in the inverse mask either belongs to a specific inverse CC or is an isolated pixel without any adjacent pixels. Each isolated pixel is designated as a single pixel inverse CC. An example of extracting the inverse CCs is described in reference to FIG. 3E below.

In Step 202, a collection of combined CCs is generated by combining the original CCs and the inverse CCs. Each CC is assigned a unique identifier in the combined CCs. For example, the unique identifiers may be a sequence of numerical identifiers individually assigned to each original CC and each inverse CC. The CCs are modified to eliminate any overlap between multiple CCs. For example, each inverse CC may be trimmed before being collected into the combined CCs to remove any pixel found in adjacent original CCs. A CC having horizontal and vertical dimensions matching the corresponding dimensions of the document image within a predetermined measure of difference (e.g., a 1% difference in both dimensions), if exists, is identified as a background CC. An identified background CC, if exists, is excluded from the collection of combined CCs. An example of generating the combined CCs is described in reference to FIG. 3F below.

In Step 203, a number of candidate text CCs are generated using the collection of combined CCs. In one or more embodiments, the candidate text CCs are generated using a first predetermined criterion. For example, the first predetermined criterion may include comparing geometric and/or fill density metrics of each combined CC to median values of corresponding metrics throughout the collection of combined CCs. An example of generating candidate text CCs is described in reference to FIG. 3J below.

In Step 204, a number of candidate background CCs are generated from the collection of combined CCs. In one or more embodiments, the candidate background CCs are generated using a second predetermined criterion. For example, the second predetermined criterion may include determining a combined CC as a candidate background CC when a percentage of background pixels in the combined CC exceeds a threshold. The percentage of background pixels may be determined within the combined CC or within a convex hull of the combined CC. In one or more embodiments, the threshold for comparing the percentage of background pixels is adjusted based on a size metric of the combines CC. An example of generating candidate background CCs is illustrated in Block 6 of the example method described in reference to FIGS. 4A-4G below.

In Step 205, a number of candidate natural image CCs are generated using the collection of combined CCs. In one or more embodiments, the candidate natural image CCs are generated using a third predetermined criterion where the candidate background CCs are excluded from the combined CCs to generate the candidate natural image CCs. For example, the third predetermined criterion may include determining a combined CC as a candidate natural image CC when a size metric and a fill density metric of the combined CC (excluding any candidate background CC) exceeds a threshold. In one or more embodiments, the size metric includes one or more of a width, a height, and a size gap between an upper portion and a lower portion of the collection of combined CCs. In one or more embodiments, the threshold for comparing the fill density metric of the combined CC is adjusted based on the size metric of the combined CC and a percentage of background pixels in the combined CC. In one or more embodiments, the threshold for comparing the size metric of the combined CC is adjusted based on whether or not the combined CC is a candidate text CC. An example of generating candidate natural image CCs is illustrated in Block 6 of the example method described in reference to FIGS. 4A-4G below.

In Step 206, a number of candidate natural image bounding boxes of the candidate natural image CCs are generated. In one or more embodiments, a candidate natural image bounding box is generated for each candidate natural image CC using a maximum and minimum X-coordinate and Y-coordinate of the candidate natural image CC. In one or more embodiments, connected components of the candidate natural image bounding boxes are identified as new CCs. For any new CCs formed from multiple candidate natural image bounding boxes, these multiple candidate natural image bounding boxes are replaced with a single candidate natural image bounding box of the new CC. Examples of new CCs are shown in FIG. 4D below. An example of a single candidate natural image bounding box replacing multiple candidate natural image bounding boxes of a new CC is shown in FIG. 4E below.

In Step 207, at least one final natural image bounding box is generated by expanding at least one candidate natural image bounding box. The expanded candidate natural image bounding box includes at least one combined CC that intersects the expanded candidate natural image bounding box. As noted above, any candidate background CCs are excluded from the collection of combined CCs where the intersecting combined CC is detected. In one or more embodiments, each final natural image bounding box is generated using an iteration cycle of iteratively expanding a candidate natural image bounding box of a new CC. Different final natural image bounding boxes are generated using separate iteration cycles. In each iteration, the candidate natural image bounding box of the new CC is expanded to include any intersecting combined CC that does not exceeds an enlarged boundary of the candidate natural image bounding box. The enlarged boundary of the candidate natural image bounding box is defined once before the iteration cycles. Any combined CC within the enlarged boundary and found to intersect with the expanded candidate natural image bounding box is merged into the expanded candidate natural image bounding box. Specifically, the expanded candidate natural image bounding box is further expanded to encompass the intersecting combined CC. In addition, the intersecting combined CC is removed from the collection of combined CCs at the end of each iteration.

The above-discussed iteration continues while at least one combined CC is found to intersect with the expanded candidate natural image bounding box. In other words, the iteration is terminated if no combined CC is found to intersect with the expanded candidate natural image bounding box.

An example of generating final natural image bounding boxes is illustrated in Block 8 of the example method described in reference to FIGS. 4A-4G below.

In one or more embodiments, the document image is modified based on the final natural image bounding boxes for presenting to a user. For example, the document image may be modified for noise reduction where natural image areas are protected from being degraded by the noise reduction algorithm. An example of this application is described in reference to FIGS. 3A-3R above. In another example, the document image may be modified by applying image-specific processing (e.g., facial recognition) to natural image areas, such as generating descriptions of the natural images using machine learning or other techniques, extracting text from the natural images, and searching the natural images for specific types of content. In yet another example, the document image may be modified by applying document semantic analysis techniques to categorize a type of the document page, identify document topics within the document page, etc.

These above discussed features in Steps 201-207 contribute to the improvements and advantages of: automatically distinguishing natural image areas having irregular pixel patterns and color variations in a complex document containing text of varying sizes, font styles and colors, shapes with a variety of fills, tables, etc.; and automatically generating descriptions of the natural images in a document, extracting text from the natural images, and searching the natural images for specific types of content, etc.

FIG. 2B shows a flowchart in accordance with one or more embodiments of the invention. One or more of the steps in FIG. 2B may be performed by the components of the system (100), discussed above in reference to FIG. 1. In one or more embodiments, one or more of the steps shown in FIG. 2B may be omitted, repeated, and/or performed in a different order than the order shown in FIG. 2B. Accordingly, the scope of the invention should not be considered limited to the specific arrangement of steps shown in FIG. 2B.

Referring to FIG. 2B, initially in Step 210, according to one or more embodiments, an original mask and an inverse mask are generated from a document image. In one or more embodiments, the Step 210 is performed the same as the Step 200 described in reference to FIG. 2A above.

In Step 211, one or more original CCs and one or more inverse CCs are extracted from the original mask. In one or more embodiments, Step 211 identical to Step 201 described in reference to FIG. 2A above.

In Step 212, a collection of combined CCs is generated by combining the original CCs and the inverse CCs. In one or more embodiments, Step 212 is identical to Step 202 described in reference to FIG. 2A above.

In Step 213, a collection of selected connected components is generated, based on a predetermined criterion, from the combined connected components. Initially, the document image is analyzed to identify common connected components, which are connected components relating to predetermined types of foreground objects. In particular, the common connected components correspond to common protection areas of the document image. For example, the common connected components may include text connected components and natural image connected components. For example, any connected component that overlaps a text bounding box by more than a predetermined percentage (e.g., a predetermined percentage of 80%) of all pixels in the connected component is identified as a text connected component. Similarly, any connected component that overlaps a natural image bounding box by more than a predetermined percentage (e.g., a predetermined percentage of 80%) of all pixels in the connected component is identified as a natural image connected component. In one or more embodiments, the natural image bounding boxes are generated using the method described in reference to FIG. 2A above.

In one or more embodiments, a non-background mask is generated where a pixel is marked if the pixel value of a corresponding pixel in the document image is different than the background color. In addition to the background connected component removed from the combined connected components in Step 213, a connected component is identified as a remaining background connected component if unmarked pixels in the non-background mask overlaps more than a predetermined percentage (e.g., a predetermined percentage of 80%) of all pixels in the connected component.

Once identified, the common connected components and the remaining background connected components are excluded from the combined connected components. Subsequent to excluding the common connected components and the background connected components, any remaining connected component that has dimensions (or other predetermined size measure) less than a predetermined threshold (e.g., a predetermined threshold of 5 pixels) is identified as a small connected component. In one or more embodiments, all common connected components, all small connected components, and all background connected components are excluded from the collection of combined connected components where the remaining subset is designated as the selected connected components.

More specifically, excluding the small connected components effectively leaves out corresponding pixels in the document image from the selected protection areas as well as the common protection areas. In other words, the pixels corresponding to the small connected components are not protected from subsequent noise reduction process. In this context, excluding the small connected components effectively performs a first level noise reduction, referred to as a cautious noise reduction. An example of generating the selected connected components is described in reference to FIGS. 3G-3K below.

In a scenario where a document image includes dark content over light background, the selected components may include one or more inverse connected components having pixels that correspond to particular selected protection areas of the document image. For an example where the text connected components and the natural image connected components are not included in the selected connected components, the particular selected protection areas may correspond to filled or stroked vector graphics content or gridlines in a data table. For example, FIG. 3K below shows the table gridlines included in the selected protection area.

In a scenario where a document image includes light content over dark background, the selected components may include one or more original connected components having pixels that correspond to particular selected protection areas of the document image. For an example where the text connected components and the natural image connected components are not included in the selected connected components, the particular selected protection areas may correspond to filled or stroked vector graphics content or gridlines in a data table. For example, FIG. 4B below shows the edge of a skull drawn as vector graphics included in the selected protection area.

In Step 214, a content mask for the pixel value conversion is generated based at least on the selected connected components. Initially, the content mask is initialized as a matrix of unmarked pixels where the matrix matches the number of pixels in horizontal and vertical dimensions of the document image. Once initialized, pixels that correspond to the common connected components are marked in the content mask. In addition to marking the pixels corresponding exactly to the common connected components, additional related pixels are also marked. For example, pixels in the entire bounding box surrounding a given CC are marked along with the pixels corresponding to the CC. In the case of text CCs, the bounding boxes are scaled up by certain factor (e.g., 1.5) and pixels in the scaled bounding box surrounding a given text CC are marked along with the pixels corresponding to the text CC. The purpose of marking entire (and scaled up) bounding boxes is to ensure that the content is well protected from subsequent morphological operations. Further, pixels that correspond to the selected connected components are also marked in the content mask. The content mask at this stage is designated as the initial content mask. Note that pixels that correspond to the small connected components will remain unmarked in the initial content mask.

Within the initial content mask, a target connected component is identified that has a first dimension (e.g., horizontal dimension) less than a predetermined dilation dimension (e.g., 3 pixels) and a second dimension (e.g., vertical dimension) exceeding the predetermined dilation dimension. Accordingly, a morphological dilation operation is performed on the initial content mask to dilate the target connected component. In particular, only the pixels of each target connect component are dilated. The content mask as a whole is not dilated. In this context, the morphological dilation operation is a selective dilation. The content mask at this stage is designated as the dilated content mask.

An example of generating the content mask is described in reference to FIGS. 3L-3P below.

In Step 215, based at least on the content mask, at least one noise pixel is identified. There are many methods to identify noise pixels and the invention is not limited to any particular method. For example, the noise pixels may be identified by applying a morphological open operation on the dilated content mask where pixels unmarked by the morphological open operation are identified as the noise pixels.

In Step 216, a final image is generated by at least converting the pixel value of the at least one noise pixel is to a uniform background color. Specifically, the final image is generated by converting all noise pixels to the uniform background color.

In Step 217, the final image is outputted. For example, the final image may be displayed on a display device for viewing by a user.

FIGS. 3A-3R and 4A-4G show implementation examples in accordance with one or more embodiments of the invention. In particular, FIGS. 3A-3R show an example of document image noise reduction with content protection. FIGS. 4A-4G show an example of finding natural images in a document page where the document page may be the same document in FIGS. 3A-3R subjected to the document image noise reduction with content protection. The implementation examples shown in FIGS. 3A-3R and 4A-4G are based on the system (100) and method flowchart described in reference to FIGS. 1 and 2A-2B above. In one or more embodiments of the invention, one or more elements shown in FIGS. 3A-3R and 4A-4G may be omitted, repeated, and/or organized in a different arrangement. Accordingly, the scope of the invention should not be considered limited to the specific arrangement of elements shown in FIGS. 3A-3R and 4A-4G.

In the example shown in FIGS. 3A-3R and 4A-4G below, the document image is the image of a single page document. Removing noise from the background of the document image improves quality (e.g., legibility) of the document image and, as a result, quality of the printed or displayed outputs generated from the document image. As described above, the background noise corresponds to pixel values which differ from the dominant pixel value of the image background. Background noise is reduced by setting pixels that are determined as "noise" to the dominant pixel value of the image background, which results in a uniform background color.

A first task to remove background noise is to identify the background itself (i.e., to distinguish the (possibly noisy) background from non-background content). This can be especially challenging when dealing with images of document pages, such as scans of Microsoft Office documents or of PDFs, because of the variety of content which may be present within the document pages. For example, a document page may contain text of varying sizes, font styles, and colors, shapes with a variety of fills, tables, and natural images (i.e., photographs of real-world scenes). This wide diversity of content types manifests as a wide diversity of visual features, effectively producing a very complex description of content.

Distinguishing background noise from natural images is especially difficult due to the irregular pixel patterns (resembling noise) contained within natural images. Improperly applying noise reduction techniques to a document image containing natural images may degrade the natural image content. One or more embodiments of this invention improves upon these points.

FIG. 3A shows an example of the document image (102) in FIG. 1 above. In particular, the document image (300) is an example of the document image (102) that is converted into a grayscale image. For example, pixels in the document image (300) have pixel values ranging from 0-255 where 0 corresponds to a black pixel and 255 corresponds to a white pixel. In this context, a pixel value closer to 0 than 255 is referred to as a dark color, and pixel value closer to 255 than 0 is referred to as a light color. Throughout the description below, the term "mark" means assigning a metadata (i.e., tag) to a pixel to indicate the marked status of the pixel in a mask. While the pixel values shown in FIG. 3A define the content of the document image (300), white pixels shown in various masks described in reference to FIGS. 3B-3R and 4A-4G below correspond to the marked pixels.

As also shown in FIG. 3A, a portion (301) of the document image (300) containing part of a natural image (i.e., a photo of a cat and a dog) is magnified as the enlarged portion (301a) to visibly show the background noises. Similarly, a portion (302) of the document image (300) containing part of a table is magnified as the enlarged portion (302a) to highlight and show the background noises. The background noises are represented as dots (304). A third portion (303) of the document image (300) is also identified for reference in describing FIGS. 3B-3C below.

As noted above, adaptive thresholding, as opposed to thresholding using a single threshold (e.g., Otsu's method), is used to convert the document image (300) into an original mask and an inverse mask. In particular, the adaptive thresholding calculates the threshold individually for each pixel, whereas the Otsu's method calculates a single threshold for the entire image. Using a single threshold for the entire image may result in either too much noise or too little content being retained after noise reduction.

An example adaptive thresholding operation is based on the formula Eq. (1) below.

$$dst(x, y) = \begin{cases} \text{maxValue} & \text{if } src(x, y) > T(x, y) \\ 0 & \text{otherwise} \end{cases} \quad \text{Eq. (1)}$$

In Eq. (1), src(x,y) denotes the pixel value of a pixel at coordinate (x,y) in the document image (300). In addition, T(x,y) denotes the threshold value that is calculated for the pixel at coordinate (x,y) based on the values of neighboring pixels surrounding the coordinate (x,y). For example, T(x,y) may be calculated as a mathematical average of pixels values of all four surrounding pixels minus a constant C. Correspondingly, dst(x,y) denotes the value assigned to the pixel at coordinate (x,y) in the original or inverse mask. By individually applying Eq. (1) across all pixels in the document image (300), dst(x,y)=maxValue indicates that the pixel at (x,y) is a marked pixel, while dst(x,y)=0 indicates that the pixel at (x,y) is an unmarked pixel.

When producing the original mask of a document image having dark content over a light background, a small positive value for C (e.g., 2 in comparison to 255) is used. The relatively small value for C tends to mark filled areas, which are areas filled with approximately uniform (or gradually changing) color, regardless of whether the filled color values are light or dark. Filled areas are marked for all types of content, including vector graphics, text characters, and portions of images.

When producing the inverse mask of a document image having dark content over a light background, C is set to zero (i.e., C=0). Setting C=0 in combination with the fact that the image pixels are inverted with respect to the original grayscale image tends to mark the inverse of what are marked in the original mask. The inverse mask tends to mark edges (i.e., areas at the boundaries of significant color changes) of all types of content, such as strokes of text or vector graphics, and gridlines in a table.

As discussed above, for a document image having dark content over a light background, the original mask tends to mark the filled areas, and the inverse mask tends to mark the edges. For example, the inverse mask tends to mark the strokes in text, gridlines of table, or other edges in the dark content. The original mask tends to mark the filled areas surrounding the edges in the dark content.

FIG. 3B shows an original mask portion (303a), which is an example of a portion of the original mask (103a) discussed above in reference to FIG. 1. Only a portion of the original mask (103a) is shown in the example here so that the noises are more visible. In particular, an adaptive thresholding operation is applied to convert the document image (300) into a corresponding original mask where the portion (303) is converted into the original mask portion (303a). In the original mask portion (303a), the region (313a) includes black pixels, representing unmarked pixels, forming the word "Looking." In other words, the filled area surrounding the word "Looking" is marked, or set to white in the original mask portion (303a). Similarly, the filled areas enclosed by gridlines of the table are also marked white in the original mask portion (303a).

FIG. 3C shows an inverse mask portion (303b), which is an example of a portion of the inverse mask (103b) discussed above in reference to FIG. 1. Only a portion of the inverse mask (103b) is shown in the example here so that the noises are more visible. In particular, an adaptive thresholding operation is applied to convert an inversion of the document image (300) into a corresponding inverse mask where the portion (303) is converted into the inverse mask portion (303b). In the inverse mask portion (303b), the region (313b) includes white pixels (i.e., with pixel value 255) forming the word "Looking." In other words, the edges (i.e., strokes in the text) forming the word "Looking" are marked white (i.e., marked and shown as white) in the inverse mask portion (303b). Similarly, the gridlines (i.e., edges) of the table are also marked white in the inverse mask portion (303b).

In the following steps, marked pixels are clustered into connected components (CCs) as higher-level representations of content and background. Based on the document image (300), white (i.e., marked) pixels in the original mask are clustered to generate a list of original CCs. Similarly, white (i.e., marked) pixels in the inverse mask are clustered to generate a list of inverse CCs. Based on the dark text on light background in the document image (300), the original CCs generally correspond to filled areas, such as enclosed areas within a text character, gridlines of a table, etc., while the inverse CCs generally correspond to edges, such as strokes of a text character, gridlines of a table, etc.

For each list of CCs, there is a corresponding "label" image, having the same dimensions and number of pixels as the document image. A unique identifier of each CC is assigned to a corresponding pixel as the pixel value in the label image. Zero is assigned as the pixel value for any pixel that is not associated with a CC. Each pixel with a non-zero pixel value in the label image is associated with a label (identifier) of the connected component (CC) to which that pixel belongs. The label of each CC is assigned by the algorithm that generates the list of CCs and is unique among all original CCs or unique among all inverse CCs. For example, the labels (identifiers) may be a set of sequential numbers.

For a typical document image, having a constant color filled (usually white) background, a page background CC may be detected in the list of original CCs as the one with similar dimension(s) to the document image. In less typical cases, such as a document image having natural images as the background, a page background CC may not be detected. The page background is not considered content and the corresponding background CC, if detected, is removed from the list of CCs.

FIG. 3D shows an original CCs (304a), which is an example of the original CCs (104a) discussed above in reference to FIG. 1. In particular, the original CCs (304a) shows a graphic representation (i.e., based on the label image) of all CCs (excluding the removed background CC) extracted from the original mask of the document image (300). Specifically, each cluster of white pixels in the original CCs (304a) represents one CC. In the original CCs (304a), the region (313c) includes two white circular shaped pixel clusters (i.e., two original CCs) that correspond to the two separate enclosed areas of the two letters "oo" in the word "Looking." Similarly, the white filled areas enclosed by gridlines of the table correspond to one or more original CCs. There are approximately 1376 original CCs in the original CCs (304a). The labels of each CC are not explicitly shown in FIG. 3D.

FIG. 3E shows an inverse CCs (304b), which is an example of the inverse CCs (104b) discussed above in reference to FIG. 1. In particular, the inverse CCs (304b) shows a graphic representation (i.e., based on the label image) of all CCs extracted from the inverse mask (303b). Specifically, each cluster of white pixels in the inverse CCs (304b) represents one CC. In the inverse CCs (304b), the region (313d) includes white pixels forming the word "Looking," where each letter of the word corresponds to one inverse CC. Similarly, the white gridlines of the table correspond to a single inverse CC. There are approximately 14320 inverse CCs in the inverse CCs (304b). The labels of each CC are not explicitly shown in FIG. 3E.

The original CCs (304a) and inverse CCs (304b) are combined to generate the combined CCs (305) as described in step (1) and step (2) below.

(1) Initialize the combined CCs to consist of copies of all the original CCs. The initialized combined CCs may consist of only copies of all the original CCs.

(2) Merge the inverse CCs into the combined CCs, leaving the copies of the original CCs unmodified. The following steps are performed to offset the sequential labels (i.e., identifiers) of the inverse CCs. Accordingly, the label of each CC is unique among all original CCs and inverse CCs in the combined CCs (305).

(i) Identify the number of original CCs as num_orig_ccs.

(ii) Offset the labels of the inverse CCs by num_orig_ccs. That is, increment the label of each inverse CC by adding num_orig_ccs.

(iii) For each of the inverse CCs being merged into the combined CCs, modify its copy at the pixel level of granularity such that the copy does not overlap any CCs already present in the combined CCs. Modifying each copy means removing any intersecting areas between the copy and already-present CCs. Because the combined CCs initially includes the original CCs copies, the original CCs copies are not modified as a result of merging the inverse CCs into the combined CCs.

Note that since the copies of the inverse CCs may have modified geometry, a modified copy of an inverse CC may include a set of disjoint pixels, rather than a set of connected pixels. In addition, some inverse CC may entirely overlap one or more original CCs and not be copied over into the combined CCs.

In contrast to combining the original mask and the inverse masks, and then generating CCs from the combined masks, generating the combined CCs as described above distinguishes the original CCs from the inverse CCs and keeps the two CCs distinct from one another. For example, the CCs representing interior filled areas of tables or vector graphics and CCs representing exterior edges of tables or vector graphics remain distinct from one another in the combined CCs. Accordingly, noises in the interior filled areas may be removed without impacting the exterior edges.

FIG. 3F shows a combined CCs (305), which is an example of the combined CCs (105) discussed above in reference to FIG. 1. In particular, the combined CCs (305) shows a graphic representation (i.e., based on the label image) of a combined list of original CCs and inverse CCs. A cluster of white pixels in an original CC and another cluster of white pixels in an adjacent inverse CC may be visibly indistinguishable from each other in the combined CCs (305), however, the two clusters of while pixels are assigned distinct labels (i.e., identifiers) that are not explicitly shown in FIG. 3F. In the combined CCs (305), the region (313e) includes white pixels that are visually combined from the white pixels in the region (313c) and the white pixels in the region (313*d*) discussed above in reference to FIGS. 3D and 3E. Note that the white pixels in the region (313*c*) and the white pixels in the region (313*d*) are assigned distinct labels. In addition, the region (313*f*) includes white pixels that are visually combined from the white pixels in the table discussed above in reference to FIGS. 3D and 3E. Note that the white pixels in the region (313*f*), although visually combined into a single rectangle, are assigned distinct labels according to distinct original CCs and inverse CCs associated with the table. For example, the original CCs corresponding to the white filled areas of the table and the inverse CC corresponding to the gridlines of the table are assigned distinct labels.

FIG. 3G shows a non-background mask (315) for removing any remaining CCs, from the selected CCs A (306*a*), that relate to the background of the document image (300). As shown in FIG. 3G, marked pixels are deemed as not belonging to the pixels that make up the background of the document image (300). For example, the text strokes, the natural images excluding certain dots, and the gridlines of the table are marked white in the non-background mask (315). Although any page background CC, if detected, are already removed from the original CCs (304*a*) and therefore is not included in the combined CCs (305) or the selected CCs A (306*a*), the detected background CC does not include all CCs that relate to the background, such as filled areas enclosed within gridlines of the table. The non-background mask (315) is generated by unmarking any pixel in the document image (300) with a pixel value that corresponds to the background color. The background color is the dominant pixel value in the document image (300). For example, the mode (i.e., peak value) of a histogram of all pixel values in the document image (300) may be used as the background color. In a scenario where the document image (300) is converted from an original color image, the background color is set based on the histogram of all pixel values in the original color image. Accordingly, the non-background mask (315) is generated by unmarking any pixel in the original color document with pixel value that corresponds to the background color.

Based on the method described above a marked pixel in the non-background mask (315) indicates that the corresponding pixel in the document image (300) does not belong to the background.

FIGS. 3H-3K show an example to identify CCs that represent selected protection areas that are not part of text or natural images.

FIG. 3H shows a selected CCs A (306*a*), which is an example of the selected CCs (106) discussed above in reference to FIG. 1. In particular, the selected CCs A (306*a*) corresponds to the combined CCs (305) excluding any CCs representing natural images.

There are various methods to identify natural images and corresponding bounding boxes from the document image (300). The invention is not limited to using any particular method to identify natural images. In some of these methods, the non-background mask (315) is used to facilitate identifying natural images from the document image (300). For example, a given CC may be categorized as a portion of a natural image by considering the fill density, which corresponds to the percent of pixels within the bounding box of the CC that are marked by the CC. The higher the percent, the higher the fill density. In an example method, natural images correspond to CCs having a fill density above a certain threshold, such as 60%. Further, the non-background mask may be used to identify the percent of pixels within the bounding box of the CC which are of the background color. The higher the percent of pixels which are of the background color, the more likely that the CC is a piece of background.

Once all natural images are identified from the document image (300), all CCs that are fully contained within the areas (e.g., defined by the bounding boxes) of the natural images are removed from the combined CCs (305) to generate the selected CCs A (306*a*). In particular, the removed CCs correspond to parts of the natural images, or in some cases correspond to bits of noise within the images. In either case, the removed CCs are excluded from, or otherwise prevented from affecting, subsequent noise reduction such that the natural images are protected against any damage from the noise reduction. This is because the CCs representing parts of natural images are often irregular and of small granularity, similar to noise, and therefore prone to destruction by noise reduction techniques.

FIG. 3I shows a selected CCs B (306*b*), which is a further example of the selected CCs (106) discussed above in reference to FIG. 1. In particular, the selected CCs B (306*b*) corresponds to the selected CCs A (306*a*) excluding any CCs representing remaining background. In other words, the selected CCs B (306*b*) corresponds to the combined CCs (305) excluding any CCs that represent natural images or remaining background. In particular, the CCs representing remaining background are referred to as page background CCs and are identified based on the percent of pixels in the CC that correspond to the background color. As noted above, a marked pixel in the non-background mask (315) indicates that the corresponding pixel in the document image (300) does not belong to the background. Accordingly, one method to identify a CC as a page background CC is by determining a percentage of the pixels of the CC that are unmarked in the non-background mask (315). For example, pixels of the CC that are unmarked in the non-background mask (315) may be identified and tallied by performing a logic AND operation of the CC and an inversed version of the non-background mask (315). The CC is determined to be a page background CC if the resultant tallied count exceeds a predetermined percentage (e.g., a predetermined percentage of 80%) of the total number of pixels in the CC.

In particular, removing all page background CCs from the selected CCs (106), or more specifically the selected CCs B (306*b*), guarantees that those CCs are not mistakenly determined to indicate content in subsequent noise reduction steps. By removing all page background CCs, all areas corresponding to page background CCs is excluded from the aforementioned selected protection areas and remain unprotected from the noise reduction.

FIG. 3J shows a selected CCs C (306*c*), which is a still further example of the selected CCs (106) discussed above in reference to FIG. 1. In particular, the selected CCs C (306*c*) corresponds to the selected CCs B (306*b*) excluding any CCs representing text characters. In other words, the selected CCs C (306*c*) corresponds to the combined CCs (305) excluding any CCs that represent natural images, remaining background, or text characters. There are various methods to identify text characters, and corresponding bounding boxes, from the document image (300). The invention is not limited to using any particular method to identify text characters.

An example method may be based on comparing one or more features of each CC to corresponding medians of all CCs. Example features include the width, height, (inferred) stroke width, density, or color uniformity of marked pixels within the bounding box of each CC. For example, if a given CC is significantly larger (e.g., 20× larger) in the largest dimension than the median CC, the CC is considered as not corresponding to text. Further, to the extent that the CC is small (e.g., <=50% in the largest dimension compared to the median), but not too small (e.g., >5 pixels in the smallest dimension), the CC is considered to correspond to text. Further, CCs with high color uniformity are more likely to correspond to text. In addition, CCs with fill densities within a given range (e.g., 40% to 60%) are more likely to correspond to text.

Regardless of the method used to infer which CCs correspond to text characters, when identifying the bounding boxes surrounding the text characters, the bounding boxes are scaled up (e.g., scaled up by 150% in all directions) to increase the probability that the bounding boxes completely contain the text areas. This expansion compensates for certain deficiencies in algorithms that find text characters based on CCs. For example, such algorithms may fail to find text characters, or parts of characters, which resemble noise, such as thin lower-case 1's and the dots over lower case 1's.

Once all CCs corresponding to text characters are identified and corresponding bounding boxes scaled up as described above, all CCs that are fully contained within the scaled bounding boxes are removed from the selected CCs B (306b) to generate the selected CCs C (306c).

The purpose of removing the natural image CCs, page background CCs, and text character CCs from the selected CCs is to allow a first level "cautious" noise reduction to occur on the remaining CCs. The first level noise reduction is the act of excluding from the aforementioned selected protection areas any CCs that is less than a minimum dimension (e.g., a dimension of 2 pixels) in all directions. Very small CCs, at this point in the workflow, are probably noise and remain unprotected from the noise reduction by being excluded from the selected protection area. One possible implementation of determining "very small" is to compare the width, height, and area of each CC to a predetermined minimum dimension (e.g., 2 pixels) or to a calculated maximum based upon the median dimensions of all CCs.

By first removing CCs which correspond to content, any of the remaining CCs that are very small are removed without the risk of removing parts of content. An example of performing the first level noise reduction to narrow down the selected protection area is shown in FIG. 3K below.

FIG. 3K shows a selected CCs D (306d), which is yet another example of the selected CCs (106) discussed above in reference to FIG. 1. In particular, the selected CCs D (306d) corresponds to the selected CCs C (306c) excluding any CCs that is less than a minimum dimension. In other words, the selected CCs D (306d) corresponds to the combined CCs (305) excluding any CCs that correspond to natural images, remaining background, text characters, or less-than-minimum dimension.

As described above regarding the selected CCs (106) discussed above in reference to FIG. 1, marked pixels in each of the selected CCs A (306a), selected CCs B (306b), selected CCs C (306a), and selected CCs D (306d) indicate areas of content in the original document image that are to be protected during noise reduction process. For example, the selected CCs D (306d) includes primarily the CC that represents gridlines of the table, which is to be protected during noise reduction process. In other words, the selected CCs D (306d) corresponds to the selected protection area in the document image (300). Specifically, the pixels in the selected CCs D (306d) marks the selected protection area in the document image (300).

FIGS. 3L-3R show an example of performing the second level "aggressive" noise reduction of the document image (300) while protecting content based on the text bounding boxes, the natural image bounding boxes, and the selected protection areas. As noted above, the content mask (107) defines a protected portion of the document image (300) enclosed by the text bounding boxes, the natural image bounding boxes, and the selected protection areas that are protected from potential degradation due to the "aggressive" noise reduction. In the example described below, the content mask marks all pixels that are reasonably likely to correspond to content, including some neighboring pixels. Once the content mask is generated, "aggressive" noise reduction, for example by means of a morphological open operation, is applied to the document image (300). The content document image (300) is protected from the morphological open operation because of the protection regions (dilated or expanded as needed) encompassing the protected portion.

FIG. 3L shows an initial content mask (307a), which is an example of the content mask (107) discussed above in reference to FIG. 1. In particular, the initial content mask (307a) contains marked pixels indicating areas of content in the document image (300), and unmarked pixels indicating areas of non-content (background or noise) in the document image (300).

The initial content mask (307a) is generated using step (a) through step (c) below.

(a) Mark all pixels in the initial content mask (307a) that correspond to the areas of a selected CCs, and set all other pixels as unmarked. While the initial content mask (307a) may be generated using any of the selected CCs described above (e.g., selected CCs A (306a), selected CCs B (306b), selected CCs C (306a), selected CCs D (306d)), using the selected CCs D (306d) has the advantage of including the benefit first level noise reduction. In particular, noises corresponding to the aforementioned very small CCs remain unprotected during the second level noise reduction below. If other selected CCs are used, noises corresponding to the aforementioned very small CCs remain to be protected during the second level noise reduction.

(b) Mark all pixels within the areas (i.e., within the bounding boxes) of natural images.

(c) Mark all pixels within the areas (i.e., within the scaled bounding boxes) of text characters.

FIG. 3M shows a dilated content mask (307b), which is a further example of the content mask (107) discussed above in reference to FIG. 1. In particular, the dilated content mask (307b) is based upon initial content mask (307a), but adds a buffer of marked pixels around selected CCs. For example, the gridlines of the table are thicker in the dilated content mask (307b) than the gridlines of the table in the initial content mask (307a).

Noise reduction may be performed on the document image (300) excluding the marked pixels in the initial content mask (307a). However, doing so may destroy certain content because, with the exception of text and images, the contours of the marked pixels of the initial content mask (307a) correspond to the edges of CCs (i.e., edges of content). Noise reduction performed on the document image (300) excluding the marked pixels in the dilated content mask (307b) reduces instances of content being destroyed by noise reduction.

The dilated content mask (307b) is generated using the method of step (a) through step (c) below.

(a) Initialize the dilated content mask (307b) as a copy of the initial content mask (307a).

(b) Identify CCs to dilate.

Note that CCs representing natural images have already been removed from the combined CCs (305) with corresponding areas already marked on the initial content mask (307a). Similarly, the CCs representing text characters have been removed from the combined CCs (305) with corresponding areas within the scaled-up bounding boxes marked on the initial content mask (307a).

Identify, for dilation, each CC having one dimension smaller than a predetermined dilation dimension (e.g., a dimension of 5 pixels) and the other dimension larger than the predetermined dilation dimension. For example, the CC being small in only one dimension may correspond to content that could be degraded or destroyed by noise removal, and therefore is dilated to protect the CC against un-intentional degradation. However, the CC being small in both dimensions is likely noise, and therefore is not protected against removal.

(c) Dilate each CC which is identified for dilation. To dilate the CC means to perform a morphological dilation operation on the pixels in the initial content mask (307a) that are marked by the CC, thereby including pixels lying immediately outside of the region originally marked by the CC.

Once the dilated content mask (307b) is generated, noise reduction is performed on the document image (300). This noise reduction is excluded from the marked pixels in the dilated content mask (307b). The first step to perform noise reduction is to discover noise pixels. There are various methods to discover noise pixels. The invention is not limited to using any particular method to discover noise pixels. An example method to discover noise pixels is described in step (a) through step (c) below.

(a) Perform a morphological open operation (i.e., erosion followed by dilation) on the dilated content mask (307b), resulting in the opened dilated content mask (307c) shown in FIG. 3N. The morphological open operation unmarks certain pixels in the dilated content mask (307b), the unmarked pixels are presumably noise. For example, the effect of erosion and dilation may be to eliminate any cluster of pixels which is less than 3 pixels in any dimension. The scattered white dots (e.g., white dot (317)) present in FIGS. 3L and 3M correspond to noise which has been mistaken for text in generating the content mask.) As discussed in reference to FIGS. 1 and 2 above, the areas corresponding to text are scaled up slightly. That's why these white dots are relatively large. These white dots (e.g., white dot (317)) are removed by the morphological open operation and not present in FIG. 3N. Specifically, these white dots (e.g., white dot (317)) are shown in FIG. 3O as pixels to unmark.

(b) Discover which noise pixels were unmarked by the morphological open operation. Calculate the pixel-by-pixel differences between the dilated content mask (307b) and the opened dilated content mask (307c) by using a bitwise XOR operation. Label the difference pixels as the "pixels to unmark," which correspond to the noise pixels. FIG. 3O shows the pixels to unmark (307d) where white pixels were unmarked by the morphological open operation.

(c) Modify the dilated content mask (307b) by setting the pixels corresponding to "pixels to unmark" to the unmarked color. The modified version of the dilated content mask (307b) is used as the final content mask, such as the final content mask (307e) shown in FIG. 3P.

Based on the final content mask (307e), the noise reduction is performed on the document image (300). Specifically, any pixels in the document image (300) that are not marked by the final content mask (307e) are set to the background color. As noted above, the background color is set based on the histogram of all pixel values in the original color image or grayscale image.

FIG. 3Q shows an example of the noise reduced version of the document image (300) shown in FIG. 3A. As shown in FIG. 3Q, the cleaned image (308a) is the noise reduced version of the document image (300). In particular, the portions (301) and (302) are magnified as the enlarged portions (301a) and (302a), respectively, where it can be seen that the noise (represented by dots (304) in FIG. 3A) are absent in the cleaned image (308a).

FIG. 3R shows an example of the difference between the cleaned image (308a) and the document image (300), which corresponds to the noise removed (i.e., noise removed (308b)) from the document image (300) in the noise reduction process. Specifically, the white dots scattered over the noise removed (308b) represent noise pixels where the pixel values are converted to the background color in the cleaned image (308a).

FIGS. 4A-4G show an example method for identifying areas occupied by natural images within a document page. The example method includes performing a connected component (CC) analysis, examining various properties of the identified CCs, and merging the CCs identified as natural images with neighboring CCs in order to find the full coverage of the natural images with the document page.

The example method described below may be used in several applications, including:

(I) Protecting natural image areas from noise reduction, which may otherwise result in degraded or destroyed natural images. An example of this application is described in reference to FIGS. 3A-3R above.

(II) Applying image-specific processing (e.g., facial recognition) to natural image areas, such as generating descriptions of the natural images using machine learning or other techniques, extracting text from the natural images, and searching the natural images for specific types of content.

(III) Applying document semantic analysis techniques to categorize a type of the document page, identify document topics within the document page, etc.

The example method described below may also contribute to the improvements and advantages of: automatically distinguishing natural image areas having irregular pixel patterns and color variations in a complex document containing text of varying sizes, font styles and colors, shapes with a variety of fills, tables, etc.; and automatically generating descriptions of the natural images in a document, extracting text from the natural images, and searching the natural images for specific types of content, etc.

The example method is described below as 9 major blocks, i.e., Block 1 through Block 9. In Block 1, a set of combined CCs is generated using method steps 200 to 202 depicted in FIG. 2B above. For example, FIG. 4A shows a grayscale image (411) and a corresponding inversed grayscale image (412). The grayscale image (411) may be a scanned image of a grayscale document or a scanned image of a color document that is converted into a grayscale image. The grayscale image (411) and the inversed grayscale image (412) include natural images, such as the natural images (413a), (414a), (417a), (418a), and the corresponding inversed natural images (413b), (414b), (417b), (418b). Note that the natural image (414a) includes English text and Japanese Kanji characters that superimpose a highlighted pattern. In particular, the highlighted pattern connects the Japanese Kanji characters (415a) and (416a) as part of the natural image (414a). However, due to a particular inversion heuristic technique used to generate the inversed grayscale image (412), the inversion of the highlighted pattern only connects the inversed Japanese Kanji character (416a) but not the inversed Japanese Kanji character (416b) as part of the inversed natural image (414b).

FIG. 4B shows the original CCs (421) (with the page background CC removed) generated from the grayscale image (411). A corresponding inverse CCs (not shown) is also generated from the inversed grayscale image (402) and combined with the original CCs (421) to generate the combined CCs (422) shown in FIG. 4B. For example, the combined CCs (422) include the combined CCs (413), (414), (417), (418) each corresponding to respective ones of the natural images (413a), (414a), (417a), (418a). Note that the combined CC (414) includes the Japanese Kanji character pattern (415) corresponding to the Japanese Kanji character (415a), while the Japanese Kanji character (416a) corresponds to a separate combined CC (416). Throughout the description of the example method Blocks 2 through 9 below, unless explicitly specified otherwise, the terms "CC" and "CCs" refer to the combined CC and combined CCs (e.g., combined CCs (422)).

In Block 2, a non-background mask is generated that marks pixels which are not of background color. An example of generating the non-background mask is described in reference to FIG. 3G above. FIG. 4C shows the non-background mask (431) generated from the combined CCs (422). In the non-background mask (431), white indicates foreground color while black indicates page background color.

In Block 3, the median width and median height of all CCs are calculated. Alternatively, an approximation of the median or a similar metric may be calculated instead.

In Block 4, additional metrics of the CCs' widths and heights are determined. The additional metrics include the smallest width, smallest height, and a significant gap metric described below. The median width, median height, smallest width, smallest height, and the significant gap metrics are collectively referred to as geometric metrics of the CCs.

To generate these additional metrics, widths and heights of the CCs are grouped into a preset number of clusters using K-means or other similar algorithms. An ordered list of width clusters and an ordered list of height clusters are created, ordered by the cluster center values (e.g., average or median width of each width cluster, average or median height of each height cluster) from smallest to largest. The ordered list of width clusters is divided into an upper portion and a lower portion based on a width threshold. The ordered list of height clusters is divided into an upper portion and a lower portion based on a height threshold. The dividing width and height thresholds between the lower and upper portions of the ordered clusters are determined by a preset value (e.g., 30%, meaning the upper portions are the clusters in the upper 30% of the ordered list of clusters). Based on the divided ordered lists, the smallest width and smallest height are found in the upper portions of the ordered clusters, In addition, it is determined if there's a significant gap between the upper and lower portions of the ordered list of clusters. The significant gap exists if the width/height values in the upper portions are significantly larger than the width/height values in the lower portions. An example criterion for determining "significantly larger" is by comparing the means and standard deviations of the width and height in the lower and upper portions. For example, the criterion is represented by Eq. (1) below.

$$(m1-s1) > (m0+(d*s0)) \qquad \text{Eq. (1)}$$

where m0 denotes the mean of the lower portions' elements, m1 denotes the mean of the upper portions' elements, s0 denotes the standard deviation of the lower portions' elements, s1 denotes the standard deviation of the upper portions' elements, and d denotes the number of standard deviations (e.g., 2).

In Block 5, it is determined which CCs may be text characters. The determination is merely a possibility that the CC may be a text character, but not a guarantee. An example method may be based on comparing one or more features of each CC to corresponding medians of all CCs. Example features include the width, height, (inferred) stroke width, density or color uniformity of marked pixels within the bounding box of each CC. For example, if a given CC is significantly larger (e.g., 20× larger) in the largest dimension than the median CC, the CC is considered as not corresponding to text, or not a candidate text CC. Further, to the extent that the CC is small (e.g., <=50% in the largest dimension compared to the median), but not too small (e.g., >5 pixels in the smallest dimension), the CC is considered to correspond to text, or is a candidate text CC. Further, CCs with high color uniformity are more likely to correspond to text or may be candidate text CCs. In addition, CCs with fill densities within a given range (e.g., 40% to 60%) are likely to correspond to text or may be candidate text CCs.

In Block 6, each CC is examined to determine which CCs correspond to background or natural images. The determination is merely a possibility that the CC may correspond to background or natural images, but not a guarantee. The CCs determined to correspond to background are added to a list of candidate background CCs while the CCs determined to correspond to natural images are added to a list of candidate natural image CCs.

Specifically, for each CC, the following processing steps (a) through (d) are performed.

In processing step (a), if a CC is categorized as background, the CC is added to the list of candidate background CCs, and the process steps move on to the next CC. In other words, the CC is excluded from being considered as a candidate natural image CC. The CC is categorized as background if either of the condition (i) or the condition (ii) below is met.

Condition (i) requires that a significant majority (e.g., more than 70%) of pixels of the CC are background color as determined based on the non-background mask (431) generated in above Block 6. The percentage of the background color pixels in the CC is computed using Eq. (2) below.

$$b0 = m1/m0 \qquad \text{Eq. (2)}$$

where b0 denotes the percent (between 0% to 100%) of all pixels in the CC with background color, m0 denotes the total number of pixels (regardless of color) of the CC, and m1 denotes the number of background color pixels of the CC according to the non-background mask (431).

Based on condition (i), a CC is categorized as a candidate background CC if the corresponding percentage b0 exceeds a predetermined threshold (e.g., 70%). For example, the CC (422a) in the combined CCs (422) of FIG. 4B corresponds to the top half of a letter "B." More than 70% of pixels in the CC (422a) are background color pixels (i.e., b0>70%) corresponding to the region (431a) of the non-background mask (431) of FIG. 4C. Accordingly, as shown in the candidate background CCs (432) of FIG. 4C, the CC (422a) is added as a candidate background CC (432a) to the list of candidate background CCs.

Note that Eq. (2) above represents a very strict metric that examines precisely the pixels marked by the CC, and no others. In contrast, condition (ii) below examines the area of a convex hull surrounding the CC as a looser metric, because pixels not marked by the CC may also be included in computing the percentage. In one or more embodiments, alternatively or in addition to the above, an even looser metric that examines the area inside the bounding box surrounding the CC may also be used.

Condition (ii) requires that a reasonably large percentage of the CC's pixels are of background color, relative to the area of the convex hull surrounding the CC. This percentage is determined according to Eq. (3) below.

$$b1=m1/m3 \qquad \text{Eq. (3)}$$

where b1 denotes the percent (between 0% to 100%) of the CC's pixels with background color relative to the convex hull of the CC, m1 denotes the number of background color pixels of the CC according to the non-background mask (431), and m3 denotes the total number of pixels (regardless of color) within the convex hull of the CC.

As with b0, above, b1 may also be compared to a predetermined threshold (e.g., 70%) as the criterion of reasonably large percentage. Alternatively, b1 may also be compared to a dynamically determined threshold (referred to as d0) based on the characteristics of the CC. For example, d0 may be determined based on the relative size of the CC and whether the CC is a candidate text CC as determined in above Block 5.

In one or more embodiments, many criteria may be used to determine if a CC is relatively small. For example, a CC is determined as small if the area of the bounding box is less than the median area of all CCs' bounding boxes. It has been determined empirically that using a smaller value of d0 works better for smaller CCs, and a larger value of d0 works better for larger CCs. For example, d0 may be initialized to 35% for small CCs and initialized to 60% for large CCs. Further, the d0 is increased slightly (e.g., by 7%) if the CC is likely a text character (i.e., a candidate text CC), effectively making the CC less likely to be determined as a candidate background CC.

Based on condition (ii), a CC is categorized as a candidate background CC if the corresponding percentage b1 exceeds the dynamically determined threshold d0 (e.g., 35% for a small CC, 42% for a small candidate text CC, 60% for a large CC, 67% for a large candidate text CC).

In processing step (b), if the CC does not have a suitably dense fill, considering both background color and foreground color pixels, the process steps move on to the next CC. In other words, the CC is determined to not be a candidate natural image CC.

The CC is determined as having a suitably dense fill if Eq. (4) below holds true.

$$f0=m0/m3, \text{ and } f0>d1 \qquad \text{Eq. (4)}$$

where f0 denotes the fill density of the CC, m0 denotes the total number of pixels (regardless of color) of the CC, m3 denotes the total number of pixels (regardless of color) within the convex hull of the CC, and d1 denotes a dynamically determined density threshold, expressed as a percent between 0% and 100%.

Note that a smaller d1 renders the CC more likely to be determined as a candidate natural image CC, and vice versa. As an example, d1 may be initialized to 20% if the CC is determined as small according to the description of above condition (ii). Otherwise, d1 is initialized to 48%. Further, if almost all (e.g., exceeding 90%) of the CC's pixels are foreground color, d1 is decreased by 4%. If the CC is extremely large (e.g., exceeding 25% of the document image page size), d1 is decreased by 4%. If a significant number (e.g., exceeding 70%) of pixels inside the CC's convex hull are background color, then d1 is increased by 10%. Note that the number of background color pixels within the convex hull is often greater than the number of background color pixels belonging to the CC (i.e., m1), because the convex hull typically includes pixels outside of the CC. Note also that a CC with a large percentage of background color pixels within the convex hull is often a text character or a vector graphic element.

Note that CCs corresponding to natural images are likely to be less dense than what may be expected intuitively. This is because in many cases, a single natural image is likely to be broken up into many CCs, some of which cover a fairly large area, but contain fairly few marked pixels within that area. In other cases, a single CC may cover multiple natural images. The connected component analysis may stitch together multiple natural images into a single CC due to some small strand of similar color/brightness stretching between the multiple natural images.

In processing step (c), if a CC is extremely large, the CC is added to the list of candidate natural image CCs, and the process steps move on to the next CC. In other words, the CC is categorized as a candidate natural image CC. The CC is determined as extremely large if the CC exceeds an extremely large threshold (e.g., 25%) of the document image page size or the CC's width and height are both in the upper portions of the width/height ordered clusters, and there is a significant gap between the lower and upper portions of the clusters (as described in Block 4 above).

In processing step (d), if a CC is medium large and is not a candidate text CC, the CC is added to the list of candidate natural image CCs, and the process steps move on to the next CC. In other words, the CC is categorized as a candidate natural image CC. The CC is determined as being medium large if the CC's width and height both exceed a predetermined multiple (e.g., 3 times) of the median width and height of all CCs.

FIG. 4D shows an example of the list of candidate natural image CCs, i.e., the candidate natural image CCs (441) where the candidate natural image CCs (443), (444), (447) correspond to the natural image (413*a*), (414*a*), (417*a*) in FIG. 4A. Note that the candidate natural image CC (444) includes the Japanese Kanji character pattern (415) shown in FIG. 4B. Due to the particular heuristic technique used in Block 6, neither the combined CC (416) nor the combined CC (418) from FIG. 4B are properly determined as candidate natural image CC. Therefore, the combined CC (416) and the combined CC (418) are omitted from the candidate natural image CCs (441).

As noted above in Block 6, any CCs categorized as a candidate background CC is excluded from being considered as a candidate natural image CC. Accordingly, in Block 7, all candidate background CCs are removed from the combined CCs generated from the document image. The remaining combined CCs are referred to as non-background combined CCs. For example, based on categorizing the candidate background CC (432*a*) shown in FIG. 4C, a corresponding combined CC is removed from the combined CCs (422) shown in FIG. 4B.

After all candidate background CCs are removed from the combined CCs, in Block 8, the areas of the candidate natural image CCs are expanded to include any portion of the non-background combined CCs (e.g., combined CC (416), (418) as discussed above) that may not have been properly determined as a candidate natural image CC in Block 6. Generally, the expansion method starts by generating a natural image mask that represents the areas enclosed by bounding boxes of the candidate natural image CCs. The natural image mask is repeatedly expanded and adjusted to encompass all CCs (i.e., in the non-background combined CCs) which are partially contained by (i.e., intersect with) the natural image mask. As the natural image mask expands, the underlying rectangular shaped bounding boxes may further encompass additional CCs, which in turn causes the natural image mask to further expand. If the expansion continues without constraint, the natural image mask may eventually incorrectly encompass the entire document image page. On the other hand, if the expansion is constrained excessively, the final natural image mask may fail to cover all portions of the natural images. In a practical implementation of one or more embodiments, the extent to which the final natural image mask expands is limited to not exceeding a predetermined percentage of the initial natural image mask (i.e., the original areas enclosed by the bounding boxes of the candidate natural image CCs). An example implementation of the expansion method is provided in TABLE 1 below. In particular, enlarged_bbox denotes enlarged bounding box.

TABLE 1 a. Create natural_image_mask, which is a mask initialized to mark the bounding boxes and enclosed areas of all candidate natural image CCs identified in Block 6.
b. Calculate the enlarged_bboxes:
    a. Generate new CCs from natural_image_mask.
    b. Calculate the bounding boxes surrounding the new CCs.
    c. Calculate an enlarged version of these bounding boxes, which are enlarged by a preset percentage (e.g. 50%, 30%, etc.) and referred to as enlarged_bboxes.
c. Identify CCs in all non-background combined CCs which intersect the marked areas of natural_image_mask, and, if appropriate, merge their areas into natural_image_mask and delete those CCs from the non-background combined CCs. Repeat that process until no marking/deleting occurs. Specifically:
    a. Repeat until no marking/deleting occurs:
        i. Generate new CCs from natural_image_mask. Call these new_ccs.
        ii. For each CC in new_ccs:
            1. Find all CCs in the non-background combined CCs which intersect the current (new) CC. Call these ccs_int.
            2. Discard any CC from ccs_int if that CC extends beyond the enlarged_bboxes. This prevents too much expansion, as explained above.
            3. Mark all pixels on natural_image_mask corresponding to enclosed areas of the bounding boxes of ccs_int.
            4. Delete ccs_int, removing the CCs from any container which holds them, as well as updating any label image. (This is the same procedure as deleting background CCs, above.) Notice that this step is deleting original image CCs, not the CCs from new_ccs.
d. Generate candidate natural image bounding boxes by generating new CCs from natural_image_mask, and finding the bounding boxes surrounding each of the new CCs.

FIG. 4D shows a natural image mask (442), which is an example of the natural_image_mask generated in entry a. of TABLE 1 with the interior of each bounding box filled-in. For example, the connected component (448) corresponds to the bounding boxes of the candidate natural image CCs (443), (444), (447) and is shown as three intersecting white rectangles that are merged together. The connected component (449) corresponds to the bounding boxes of corresponding candidate natural image CCs in the candidate natural image CCs (441) and is shown as two intersecting white rectangles that are merged together. The connected components (448) and (449) correspond to two new CCs generated in the first iteration of the entry c.a.i. of TABLE 1 above. The example implementation of the expansion method may be performed for each new CC in the new_ccs function.

FIG. 4E shows bounding box A (450) of connected component (448) intersecting with combined CC (416) which, as noted above, is not properly determined as any candidate natural image CC. In other words, the combined CC (416) is considered as ccs_int in entry c. sub-entry a. sub-sub-entry ii of TABLE 1. Because combined CC (416) is within the enlarged_bbox (e.g., 50% larger) of bounding box A (450), bounding box A (450) is expanded to become bounding box B (451) that encompasses combined CC (416). For clarity and brevity, the candidate natural image CCs making up the connected component (448) are not explicitly shown in FIG. 4E.

FIG. 4F shows a bounding box C (460) of connected component (449) intersecting with combined CC (418) which, as noted above, is not properly determined as any candidate natural image CC. In other words, the combined CC (418) is considered as ccs_int in entry c. sub-entry a. sub-sub-entry ii of TABLE 1. Because combined CC (418) is within the enlarged_bbox (e.g., 50% larger) of bounding box C (460), bounding box C (460) is expanded to become bounding box D (461) that encompasses combined CC (418). The candidate natural image CCs making up connected component (449) are shown in FIG. 4F to illustrate the relative position of connected CC (418).

In Block 9, a list of final natural image bounding boxes is produced by discarding any candidate natural image bounding boxes whose content has non-image properties. Many types of properties may be considered in Block 9 to be discarded, such as any areas which contain vector graphics. For example, geometry filled strokes and/or strokes with solid colors may be detected by checking for color uniformity. In particular, a bounding box which contains only one or two non-background colors is likely to hold a vector graphic.

FIG. 4G shows a list of final natural image boxes (471) (left) and a grayscale image (411) overlaid with the final natural image boxes (471) (right). In particular, the final natural image boxes (471) include bounding box B (451)

and bounding box D (461) described above. Specifically, bounding box B (451) encompasses at least the Japanese Kanji characters (415*a*) and (416*a*) of the natural image (414*a*), and bounding box D (461) encompasses at least the natural image (418*a*). In the noise reduction application described above, document contents encompassed within the final natural image boxes (471) are treated as the natural images and are protected from being destroyed and/or deteriorated by the noise removal (cleaning) process. In other applications described above, the document contents encompassed within the final natural image boxes (471) are treated as the natural images and are applied to facial recognition or document topic identification. This results in the improvements and advantages of automatically generating a modified version of the document to reduce document scanning noise where natural image areas are protected from being degraded by the noise reduction algorithm.

Embodiments of the invention may be implemented on virtually any type of computing system, regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable instructions to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable instructions that when executed by a processor(s), is configured to perform embodiments of the invention.

Further, one or more elements of the aforementioned computing system (500) may be located at a remote location and be connected to the other elements over a network (512). Further, one or more embodiments of the invention may be implemented on a distributed system having a plurality of nodes, where each portion of the invention may be located on a different node within the distributed system. In one or more embodiments, the node corresponds to a distinct computing device. Alternatively, the node may correspond to a computer processor with associated physical memory. The node may alternatively correspond to a computer processor or micro-core of a computer processor with shared memory and/or resources.

One or more embodiments of the present invention provide the following improvements in electronic document generation and processing technologies: automatically distinguishing natural image areas having irregular pixel patterns and color variations in a complex document containing text of varying sizes, font styles and colors, shapes with a variety of fills, tables, etc.; automatically generating a modified version of the document to reduce document scanning noise where natural image areas are protected from being degraded by the noise reduction algorithm; automatically generating descriptions of the natural images in a document, extracting text from the natural images, and searching the natural images for specific types of content, etc.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An image processing method for identifying a natural image, including photographs of real world scenes, in a document image, the method comprising:
    generating, by a computer processor and from the document image, a plurality of combined connected components (CCs) relating to predetermined types of foreground objects and background portions of the document image;
    generating, by the computer processor from the plurality of combined CCs and based on a first predetermined criterion, a plurality of candidate text CCs including a portion of the combined CCs that are heuristically determined as connected components that are likely to correspond to text characters in the document image, wherein the first predetermined criterion includes comparing geometric and/or fill density metrics of each combined CC to median values of corresponding metrics throughout the collection of the combined CCs;
    generating, by the computer processor from the plurality of combined CCs and based on a second predetermined criterion, a plurality of candidate background CCs including a portion of the combined CCs that are heuristically determined as connected components that are likely to correspond to the background of the document image;
    generating, by the computer processor from the plurality of combined CCs and based on a third predetermined criterion, a plurality of candidate natural image CCs including a portion of the combined CCs that are heuristically determined as connected components that are likely to correspond to natural images in the document image, wherein the plurality of candidate background CCs are excluded from the plurality of combined CCs to generate the plurality of candidate natural image CCs, and the third predetermined criterion is dependent on the plurality of candidate text CCs;

generating, by the computer processor, a plurality of candidate natural image bounding boxes of the plurality of candidate natural image CCs;

generating, by the computer processor, at least one final natural image bounding box by expanding at least one candidate natural image bounding box and including in the expanded at least one candidate natural image bounding box at least one combined CC of the plurality of combined CCs that intersects the expanded at least one candidate natural image bounding box; and modifying, by the computer processor and based on the at least one final natural image bounding box, the document image and displaying the modified document image to a user.

2. The method of claim 1, wherein
generating the plurality of combined CCs comprises:
generating, from the document image, an original mask and an inverse mask of the document image;
extracting, from the original mask, a plurality of original CCs; and
extracting, from the inverse mask, a plurality of inverse CCs, and
the plurality of combined CCs are generated based on the plurality of original CCs and the plurality of inverse CCs.

3. The method of claim 1, wherein generating the plurality of candidate background CCs based on the second predetermined criterion comprises:
determining a percentage of background pixels of a combined CC of the plurality of combined CCs; and
determining, in response to the percentage exceeding a threshold, that the combined CC is one of the plurality of candidate background CCs.

4. The method of claim 3, wherein
the percentage of background pixels is determined within the combined CC or within a convex hull of the combined CC, and
the method further comprises adjusting, based on a size metric of the combined CC, a predetermined threshold to generate the threshold for comparing the percentage of background pixels.

5. The method of claim 1, wherein
generating the plurality of candidate natural image CCs based on the third predetermined criterion comprises:
determining a fill density of a combined CC of the plurality of combined CCs; and
excluding, in response to the fill density being less than a threshold, the combine CC from the plurality of candidate background CCs, and
the method further comprises adjusting, based on a size metric of the combined CC and a percentage of background pixels of the combined CC, a predetermined threshold to generate the threshold for comparing the fill density of the combined CC.

6. The method of claim 1, wherein
generating the plurality of candidate natural image CCs based on the third predetermined criterion comprises:
determining a size metric of a combined CC of the plurality of combined CCs; and
determining, in response to the size metric exceeding a threshold, that the combined CC is one of the plurality of candidate natural image CCs, the threshold is adjusted based on whether the combined CC is one of the plurality of candidate text CCs, the size metric comprises a width, a height, and a size gap between an upper portion and a lower portion of the plurality of combined CCs, and the method further comprises reducing, in response to determining that the combined CC is not a candidate text CC, the threshold prior to comparing the size metric of the combined CC and the threshold.

7. The method of claim 1, wherein
the expanding and the including are performed for a plurality of iterations that terminate when none of the plurality of combined CCs intersects the iteratively expanded candidate natural image bounding box or when the iteratively expanded candidate natural image bounding box exceeds a predetermined percentage of the document image, and
the at least one combined CC is removed from the plurality of combined CCs for a next iteration.

8. A system for processing an image to identify a natural image, including photographs of real world scenes, in a document image, the system comprising:
a memory; and
a computer processor connected to the memory and that:
generates, from the document image, a plurality of combined connected components (CCs) relating to predetermined types of foreground objects and background portions of the document image;
generates, from the plurality of combined CCs and based on a first predetermined criterion, a plurality of candidate text CCs including a portion of the combined CCs that are heuristically determined as connected components that are likely to correspond to text characters in the document image, wherein the first predetermined criterion includes comparing geometric and/or fill density metrics of each combined CC to median values of corresponding metrics throughout the collection of the combined CCs;
generates, from the plurality of combined CCs and based on a second predetermined criterion, a plurality of candidate background CCs including a portion of the combined CCs that are heuristically determined as connected components that are likely to correspond to the background of the document image;
generates, from the plurality of combined CCs and based on a third predetermined criterion, a plurality of candidate natural image CCs including a portion of the combined CCs that are heuristically determined as connected components that are likely to correspond to natural images in the document image, wherein
the plurality of candidate background CCs are excluded from the plurality of combined CCs to generate the plurality of candidate natural image CCs, and
the third predetermined criterion is dependent on the plurality of candidate text CCs;
generates a plurality of candidate natural image bounding boxes of the plurality of candidate natural image CCs;
generates at least one final natural image bounding box by expanding at least one candidate natural image bounding box and including in the expanded at least one candidate natural image bounding box at least one combined CC of the plurality of combined CCs that intersects the expanded at least one candidate natural image bounding box; and
modifies, based on the at least one final natural image bounding box, the document image and displays the modified document image to a user.

9. The system of claim 8, wherein
generating the plurality of combined CCs comprises:
generating, from the document image, an original mask and an inverse mask of the document image;
extracting, from the original mask, a plurality of original CCs; and
extracting, from the inverse mask, a plurality of inverse CCs, and
the plurality of combined CCs are generated based on the plurality of original CCs and the plurality of inverse CCs.

10. The system of claim 8, wherein generating the plurality of candidate background CCs based on the second predetermined criterion comprises:
determining a percentage of background pixels of a combined CC of the plurality of combined CCs; and
determining, in response to the percentage exceeding a threshold, that the combined CC is one of the plurality of candidate background CCs.

11. The system of claim 10, wherein
the percentage of background pixels is determined within the combined CC or within a convex hull of the combined CC, and
the computer processor further adjusts, based on a size metric of the combined CC, a predetermined threshold to generate the threshold for comparing the percentage of background pixels.

12. The system of claim 8, wherein
generating the plurality of candidate natural image CCs based on the third predetermined criterion comprises:
determining a fill density of a combined CC of the plurality of combined CCs; and
excluding, in response to the fill density being less than a threshold, the combine CC from the plurality of candidate background CCs, and
the computer processor further adjusts, based on a size metric of the combined CC and a percentage of background pixels of the combined CC, a predetermined threshold to generate the threshold for comparing the fill density of the combined CC.

13. The system of claim 8, wherein
generating the plurality of candidate natural image CCs based on the third predetermined criterion comprises:
determining a size metric of a combined CC of the plurality of combined CCs; and
determining, in response to the size metric exceeding a threshold, that the combined CC is one of the plurality of candidate natural image CCs,
the threshold is adjusted based on whether the combined CC is one of the plurality of candidate text CCs,
the size metric comprises a width, a height, and a size gap between an upper portion and a lower portion of the plurality of combined CCs, and
the computer processor further reduces, in response to determining that the combined CC is not a candidate text CC, the threshold prior to comparing the size metric of the combined CC and the threshold.

14. The system of claim 8, wherein
the expanding and the including are performed for a plurality of iterations that terminate when none of the plurality of combined CCs intersects the iteratively expanded candidate natural image bounding box or when the iteratively expanded candidate natural image bounding box exceeds a predetermined percentage of the document image, and
the at least one combined CC is removed from the plurality of combined CCs for a next iteration.

15. A non-transitory computer readable medium (CRM) storing computer readable instructions for an image processing method that identifies a natural image, including photographs of real world scenes, in a document image, wherein the computer readable instructions, when executed by a computer, comprises functionality for:
generating, from the document image, a plurality of combined connected components (CCs) relating to predetermined types of foreground objects and background portions of the document image;
generating, from the plurality of combined CCs and based on a first predetermined criterion, a plurality of candidate text CCs including a portion of the combined CCs that are heuristically determined as connected components that are likely to correspond to text characters in the document image, wherein the first predetermined criterion includes comparing geometric and/or fill density metrics of each combined CC to median values of corresponding metrics throughout the collection of the combined CCs;
generating, from the plurality of combined CCs and based on a second predetermined criterion, a plurality of candidate background CCs including a portion of the combined CCs that are heuristically determined as connected components that are likely to correspond to the background of the document image;
generating, from the plurality of combined CCs and based on a third predetermined criterion, a plurality of candidate natural image CCs including a portion of the combined CCs that are heuristically determined as connected components that are likely to correspond to natural images in the document image, wherein
the plurality of candidate background CCs are excluded from the plurality of combined CCs to generate the plurality of candidate natural image CCs, and
the third predetermined criterion is dependent on the plurality of candidate text CCs;
generating a plurality of candidate natural image bounding boxes of the plurality of candidate natural image CCs;
generating at least one final natural image bounding box by expanding at least one candidate natural image bounding box and including in the expanded at least one candidate natural image bounding box at least one combined CC of the plurality of combined CCs that intersects the expanded at least one candidate natural image bounding box; and
modifying, based on the at least one final natural image bounding box, the document image and displaying the modified document image to a user.

16. The non-transitory CRM of claim 15, wherein
generating the plurality of combined CCs comprises:
generating, from the document image, an original mask and an inverse mask of the document image;
extracting, from the original mask, a plurality of original CCs; and
extracting, from the inverse mask, a plurality of inverse CCs, and
the plurality of combined CCs are generated based on the plurality of original CCs and the plurality of inverse CCs.

17. The non-transitory CRM of claim 15, wherein generating the plurality of candidate background CCs based on the second predetermined criterion comprises:
determining a percentage of background pixels of a combined CC of the plurality of combined CCs; and determining, in response to the percentage exceeding a threshold, that the combined CC is one of the plurality of candidate background CCs.

18. The non-transitory CRM of claim 17, wherein
the percentage of background pixels is determined within the combined CC or within a convex hull of the combined CC, and
the computer readable instructions, when executed by the computer, further comprises functionality for adjusting, based on a size metric of the combined CC, a predetermined threshold to generate the threshold for comparing the percentage of background pixels.

19. The non-transitory CRM of claim 15, wherein
generating the plurality of candidate natural image CCs based on the third predetermined criterion comprises:
determining a fill density of a combined CC of the plurality of combined CCs; and
excluding, in response to the fill density being less than a threshold, the combine CC from the plurality of candidate background CCs, and
the computer readable instructions, when executed by the computer, further comprises functionality for adjusting, based on a size metric of the combined CC and a percentage of background pixels of the combined CC, a predetermined threshold to generate the threshold for comparing the fill density of the combined CC.

20. The non-transitory CRM of claim 15, wherein
generating the plurality of candidate natural image CCs based on the third predetermined criterion comprises:
determining a size metric of a combined CC of the plurality of combined CCs; and
determining, in response to the size metric exceeding a threshold, that the combined CC is one of the plurality of candidate natural image CCs,
the threshold is adjusted based on whether the combined CC is one of the plurality of candidate text CCs,
the size metric comprises a width, a height, and a size gap between an upper portion and a lower portion of the plurality of combined CCs, and
the computer readable instructions, when executed by the computer, further comprises functionality for reducing, in response to determining that the combined CC is not a candidate text CC, the threshold prior to comparing the size metric of the combined CC and the threshold.

21. The non-transitory CRM of claim 15, wherein
the expanding and the including are performed for a plurality of iterations that terminate when none of the plurality of combined CCs intersects the iteratively expanded candidate natural image bounding box or when the iteratively expanded candidate natural image bounding box exceeds a predetermined percentage of the document image, and
the at least one combined CC is removed from the plurality of combined CCs for a next iteration.

\* \* \* \* \*